United States Patent [19]

Chang

[11] Patent Number: 5,105,704
[45] Date of Patent: Apr. 21, 1992

[54] ADJUSTABLE SAW BLADE FASTENER

[76] Inventor: Andy Chang, No. 38, Juan Liau Road, Fong Yuan, Taichung, Taiwan

[21] Appl. No.: 697,708

[22] Filed: May 9, 1991

[51] Int. Cl.$^5$ ............................................. B27B 19/02
[52] U.S. Cl. ........................................ 83/662; 83/698; 83/783
[58] Field of Search ................. 83/783, 698, 699, 662, 83/784; 30/392

[56] References Cited

U.S. PATENT DOCUMENTS

| | | | |
|---|---|---|---|
| 4,838,138 | 6/1989 | Rice et al. | 83/783 X |
| 5,016,512 | 5/1991 | Huang | 83/783 |
| 5,058,280 | 10/1991 | Pollak et al. | 83/783 X |

Primary Examiner—Douglas D. Watts
Assistant Examiner—Kenneth E. Peterson
Attorney, Agent, or Firm—Bucknam and Archer

[57] ABSTRACT

A saw blade fastener comprising two fastening plates respectively secured by two adjusting screws to two saw blade holding plates for holding a saw blade therebetween, wherein said fastening plates have each a ring-shaped projection at one side and a flat surface portion at an opposite end. The flat surface portion of each fastening plate is respectively attached to the saw blade holding plates when a flat type saw blade is to be retained; the ring-shaped projection of each fastening plate is respectively attached to the saw blade holding plates when a pin type saw blade is to be retained.

1 Claim, 2 Drawing Sheets

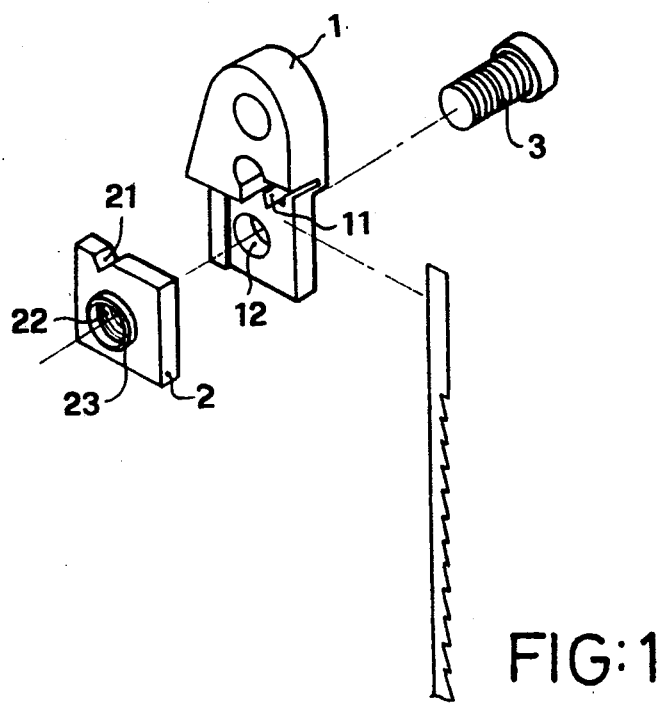
FIG:1
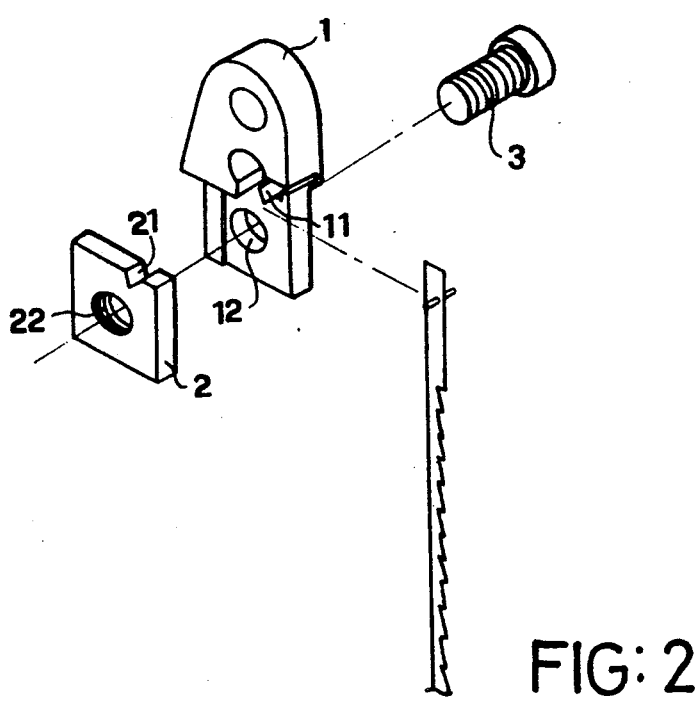
FIG:2

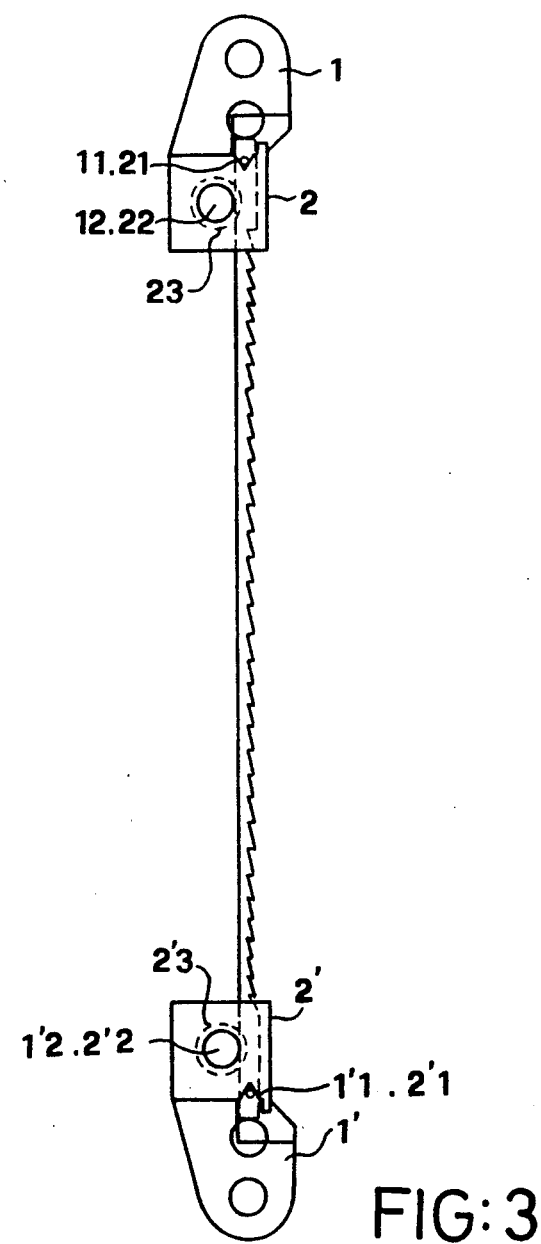
FIG: 3

ADJUSTABLE SAW BLADE FASTENER

BACKGROUND OF THE INVENTION

The present invention relates to saw blade fastening devices and relates more particularly to a saw blade fastener which can be adjusted for holding different type of saw blade.

Scroll saw has been specifically designed for cutting thin wood, plastic or metal sheet into spiral or ornamental designs. For cutting different working pieces, the tension of the scroll saw blade must be different. Therefore, saw blade fasteners must be used in a scroll saw for holding a saw blade permitting it to be adjusted on the tension. For controlling the tension of a saw blade, adjusting screw is commonly used. In regular scroll saws, two different types of saw blades may be used, namely the flat type and the pin type. A flat type saw blade is the one which has two flat, opposite ends. A pin type saw blade is the one which two two pins at the two opposite ends thereof. Therefore, a saw blade fastener which is designed for holding a flat type saw blade is not applicable for holding a pin type saw blade and vice versa.

The present invention has been accomplished to eliminate the aforesaid problem. It is therefore the main object of the present invention to provide an adjustable saw blade fastener which can be used for holding a flat type saw blade as well as a pin type saw blade alternatively.

BRIEF DESCRIPTION OF THE DRAWINGS

FIG. 1 is a dismantled perspective view illustrating an application of the present invention in fastening a flat type of saw blade;

FIG. 2 is a dismantled perspective view illustrating another application of the present invention in fastening a pin type of saw blade; and FIG. 3 illustrates that a pin type saw blade is held between two saw blade holder plates by two fastening plates and two adjusting screws.

DETAILED DESCRIPTION OF THE PREFERRED EMBODIMENTS

Referring to FIG. 1, a scroll saw blade fastener in accordance with the present invention is generally comprised of two saw blade holder plates 1 and 1', two fastening plates 2 and 2' and two adjusting screws 3 and 3'.

Saw blade holder plate 1 or 1' is comprised of an elongated, flat body longitudinally extending from an arched head, having a V-shaped retaining notch 11 or 11' for mounting a pin type saw blade, a hole 12 or 12' for fastening an adjusting screw 3 or 3'.

Fastening plate 2 or 2' is made in square shape, having a V-shaped notch 21 or 21' on the side edge thereof at a location corresponding to the V-shaped notch 11 or 11' on the holder plate 1 or 1' for mounting a pin type saw blade, a bolt hole 22 or 22' at the center for fastening an adjusting screw 3 or 3' and a ring-shaped projection 23 or 23' surrounding said bolt hole 22 or 22' at one side. When the fastening plate 2 or 2' is secured to the saw blade holder plate 1 or 1' by an adjusting screw 3 or 3', the ring-shaped projection 23 or 23' may be stopped against the saw blade holder plate 1 or 1' so as to define a gap between the saw blade holder plate 1 or 1' and the fastening plate 2 or 2' for fastening a pin type saw blade. Adjusting screw 3 or 3' is inserted through the hole 12 or 12' on the saw blade holder plate 1 or 1' and fastened up with the bolt hole 22 or 22' on the fastening plate 2 or 2'. The tension of the saw blade held in the scroll saw blade fastener of the present invention can be adjusted by rotating the adjusting screws 3 and 3' on the fastening plates 2 and 2'.

Referring to FIG. 1 again, for fastening a flat type scroll saw blade, the two opposite, flat ends of a flat type scroll saw blade are respectively attached to the saw blade holder plates 1 and 1' and the, the fastening plates 2 and 2' are respectively attached to the two opposite, flat ends of said flat type scroll saw blade with the ring-shaped projections 22 and 22' respectively disposed at the outside. Then, the adjusting screws 3 and 3' are respectively fastened through the saw blade holder plates 1 and 1' into the bolt holes 22 and 22' on the fastening plates 2 and 2' to firmly secure the flat type scroll saw blade in place between the two saw blade holder plates 1 and 1'.

Referring to FIGS. 2 and 3, for fastening a pin type scroll saw blade, the two fastening plates 2 and 2' are respectively attached to the two saw blade holder plates 1 and 1' with the ring-shaped projections 22 and 22' respectively stopped against the two saw blade holder plates 1 and 1' permitting the two pins at the two opposite ends of the pin type scroll saw blade to be fastener respectively fastened in the V-shaped notches 21 and 11; 21' and 11'. Then, the adjusting screws 3 and 3' are respectively fastened screws 3 and 3' are respectively fastened through the saw blade holder plates 1 and 1' into the bolt holes 22 and 22' on the fastening plates 2 and 2' to firmly secure the pin type scroll saw blade in place. By means of rotating the adjusting screws 3 and 3' on the fastening plates 2 and 2', the tension of the scroll saw blade is adjusted.

As indicated, by changing the position of the fastening plates 2 and 2' relative to the saw blade holder plates 1 and 1', the scroll saw blade fastener of the present invention can be conveniently used to hold a flat or pin type scroll saw blade.

It is to be understood that the drawings are designed for purposes of illustration only, and are not intended as definition of the limits and scope of the invention disclosed. Various modifications could be made to the present invention without departing from the basic teaching thereof.

What is claimed is:

1. A scroll saw blade fastener, comprising two saw blade holders for holding a saw blade therebetween, said two saw blade holders comprising each a saw blade holding plate, a fastening plate and an adjusting screw for securing said fastening plate to said saw blade holding plate; wherein said saw blade holding plate has a V-shaped notch and a through-hole; said fastening plate has a V-shaped notch corresponding to the V-shaped notch on said saw blade holding plate, a bolt hole corresponding to the through-hole on said saw blade holding plate, a flat surface portion at one side and a ring-shaped projection surrounding said bolt hole and projecting from a side opposite said one; and wherein said fastening plate is secured to said saw blade holding plate by said adjusting screw with said ring-shaped projection stopped against said saw blade holding plate for holding a pin type saw blade therebetween or with said flat surface portion stopped against said saw blade holding plate for holding a flat type saw blade therebetween.

* * * * *